United States Patent [19]

Scherenberg et al.

[11] 3,942,816

[45] Mar. 9, 1976

[54] FRONT WHEEL SUSPENSION FOR MOTOR VEHICLES

[75] Inventors: Hans O. Scherenberg, Stuttgart; Friedrich H. van Winsen, Kirchheim; Erich Waxenberger, Neuhausen, all of Germany

[73] Assignee: Daimler-Benz AG, Germany

[22] Filed: Nov. 4, 1974

[21] Appl. No.: 520,908

[30] Foreign Application Priority Data

Nov. 7, 1973    Germany............................ 2355588

[52] U.S. Cl............................ 280/96.2 R; 267/20 A
[51] Int. Cl.².......................................... B62D 7/16
[58] Field of Search ..... 280/96.2 R, 96.2 B, 96.2 A, 280/124 A, 96.1; 267/20 A

[56] References Cited
UNITED STATES PATENTS

| | | | |
|---|---|---|---|
| 3,237,962 | 3/1966 | Kraus et al..................... | 280/96.2 R |
| 3,256,028 | 6/1966 | Fehlberg....................... | 267/20 A X |
| 3,257,121 | 6/1966 | Muller............................ | 280/96.2 R |
| 3,620,548 | 11/1971 | van Winsen................... | 280/96.2 R |
| 3,819,202 | 6/1974 | Castoe........................... | 280/96.2 B |
| 3,831,967 | 8/1974 | Uhlenhaut et al. ........ | 280/96.2 R X |

*Primary Examiner*—Leo Friaglia
*Attorney, Agent, or Firm*—Craig & Antonelli

[57] ABSTRACT

A front wheel suspension for motor vehicles with the use of a triangularly shaped guide member whose two guide arms are elastically supported at the vehicle superstructure in such a way that of the two guide arms, the forwardly disposed guide arm is directly elastically connected at the vehicle superstructure while the rear guide arm is connected with the vehicle superstructure by way of a cross yoke that is common to the wheel suspensions of both vehicle sides; the forward and rear guide arm of each triangular guide member are thereby pivotally connected with each other and a relatively radially soft bearing support is used for the forward guide arm at the vehicle superstructure; while the rear guide arm is pivotally connected at the cross yoke in such a manner that the connection of the rear guide arm with the cross yoke is constructed relatively hard at least in the direction of the line of force determined by its points of pivotal connection.

34 Claims, 3 Drawing Figures

FRONT WHEEL SUSPENSION FOR MOTOR VEHICLES

The present invention relates to a front wheel suspension for motor vehicles with the use of a triangularly shaped guide member whose two mutually connected guide arms are elastically supported independently of one another at the vehicle superstructure in such a manner that of the two guide members of the wheels disposed mutually opposite one another on the two vehicle sides, the respective forward guide arm which extends in the vehicle transverse direction is supported directly at the vehicle superstructure and the respective rear guide arm which extends obliquely rearwardly is elastically supported on a cross yoke independent of the remaining wheel suspension and common to the wheel suspension of both vehicle sides which, in its turn, is elastically connected with lateral longitudinal bearers of the vehicle superstructure as disclosed in the German Auslegeschrift No. 2,142,523.

In a wheel suspension according to the aforementioned German Auslegeschrift, in which the respective rear guide arm of triangular guide members coordinated to two wheels disposed mutually opposite on the two vehicle sides, is elastically supported on a common cross yoke which, in its turn, is elastically connected with the lateral longitudinal bearers of the vehicle superstructure, the so-called "jolting", i.e., the tendency toward shock-like vibrations of the vehicle is far-reachingly prevented and also a transmission of noises from the wheel suspension by way of the rear guide arm into the vehicle superstructure is also far-reachingly avoided. However, the rigid construction of the triangularly shaped guide member, i.e., the rigid connection between the forward and the rear guide arm of each triangular guide member requires in the construction according to the aforementioned German Auslegeschrift, a relatively hard construction of the elastic bearing support in the radial direction, by way of which the forward guide arm is mounted at the vehicle superstructure in order to avoid steering difficulties and to attain a neutral behavior of the axle during braking. However, the radially hard construction of the elastic bearing support provided in the transition from the forward guide arm to the vehicle superstructure favors, on the other hand, the introduction of transverse vibrations which may be the cause for undesired noises and may impair the driving comfort.

The present invention is now concerned with the task to further develop a front wheel suspension according to the aforementioned German Auslegeschrift to the effect that the introduction of cross vibrations into the vehicle superstructure by way of the forward guide arm is at least far-reachingly avoided and the quality of the wheel suspension as regards a neutral behavior of the axle during braking is at least not impaired.

According to the present invention, this is achieved with a front wheel suspension of the aforementioned type in that with a radially soft construction of the pivotal connection of the forward guide arms at the vehicle superstructure, the forward and the rear guide arm of each triangular guide member are connected with each other by a jointed or articulated connection and in that with a jointed or articulated support of the rear guide arms at the cross yoke, the connection thereof with the cross yoke is constructed hard at least in the direction of the line of force determined by its point of pivotal connections. The radially soft construction of the pivotal connection of the forward guide arm at the vehicle superstructure, i.e., soft in particular in the vehicle transverse direction, and the improvement conditioned thereby as regards the absorption of transverse shocks and transverse vibrations is possible without impairment of the behavior of the front axle during braking since the forces acting during the braking in the longitudinal direction of the forward guide arm are considerably smaller in a construction according to the present invention than with a rigid construction of the triangular guide member. The tendency that during the braking the front wheel with an unchanged steering position passes over into toe-out as a result of the outward movement of the forward guide member and thereby impairs the neutral behavior of the axle with unequal braking on the two sides, is at least considerably reduced thereby so that the attained comfort improvement at least does not have as a consequence any impairment of the driving behavior. The hard support of the rear guide arm with respect to the cross yoke which is hard in the direction of the line of action of the forces transmitted by way of the rear guide arm, has proved as important in order to preclude in case of longitudinal forces, and thus also in case of braking forces, an undesirably large displacement which in turn might have again as a consequence undesirable steering effects.

In view of the fact that the longitudinal forces are absorbed in the solution according to the present invention practically exclusively by way of the rear guide arm, it is advantageous if the force line of action determined by the points of pivotal connection of the respective guide arm, extends approximately through the straight line connecting the points of pivotal connection of the cross yoke at the vehicle superstructure. Undesirably large stresses and constraints in the elastic bearing supports provided between the vehicle superstructure and the cross yoke can be avoided thereby without having to abandon the goal with the relatively large longitudinal forces in the rear guide arms which exist in the instant solution, of obtaining an improved brake nose-diving support by a corresponding location of the pivotal connections of the guide arms at the cross yoke with respect to the pivotal connections of the cross yoke at the vehicle superstructure. In view of the relatively large forces, however, only relatively small lever arms are necessary in the solution according to the present invention and also possible because large lever arms would render necessary an excessively hard construction of the elastic connections between the cross yoke and the vehicle superstructure.

The connection of the rear guide arms with the cross yoke may be constituted by a ball joint each in one embodiment of the present invention.

Accordingly, it is an object of the present invention to provide a front wheel suspension for motor vehicles which avoids by simple means the aforementioned shortcomings and drawbacks encountered in the prior art.

Another object of the present invention resides in a front wheel suspension for motor vehicles which prevents the introduction of transverse vibrations into the vehicle and reduces the existence of undesired noises.

A further object of the present invention resides in a front wheel suspension for motor vehicles in which the driving comfort is improved without impairing the neutral behavior of the axle during braking and without introducing additional steering difficulties.

Still a further object of the present invention resides in a wheel suspension for motor vehicles in which an improvement of the driving characteristics is attained at least without impairing the neutral behavior of the axle during braking.

Another object of the present invention resides in a front wheel suspension for motor vehicles which exhibits an improved absorption of cross shocks and cross vibrations without jeopardizing the neutral behavior of the axle.

These and other objects, features and advantages of the present invention will become more apparent from the following description when taken in connection with the accompanying drawing which shows, for purposes of illustration only, one embodiment in accordance with the present invention and wherein.

Figure 1:
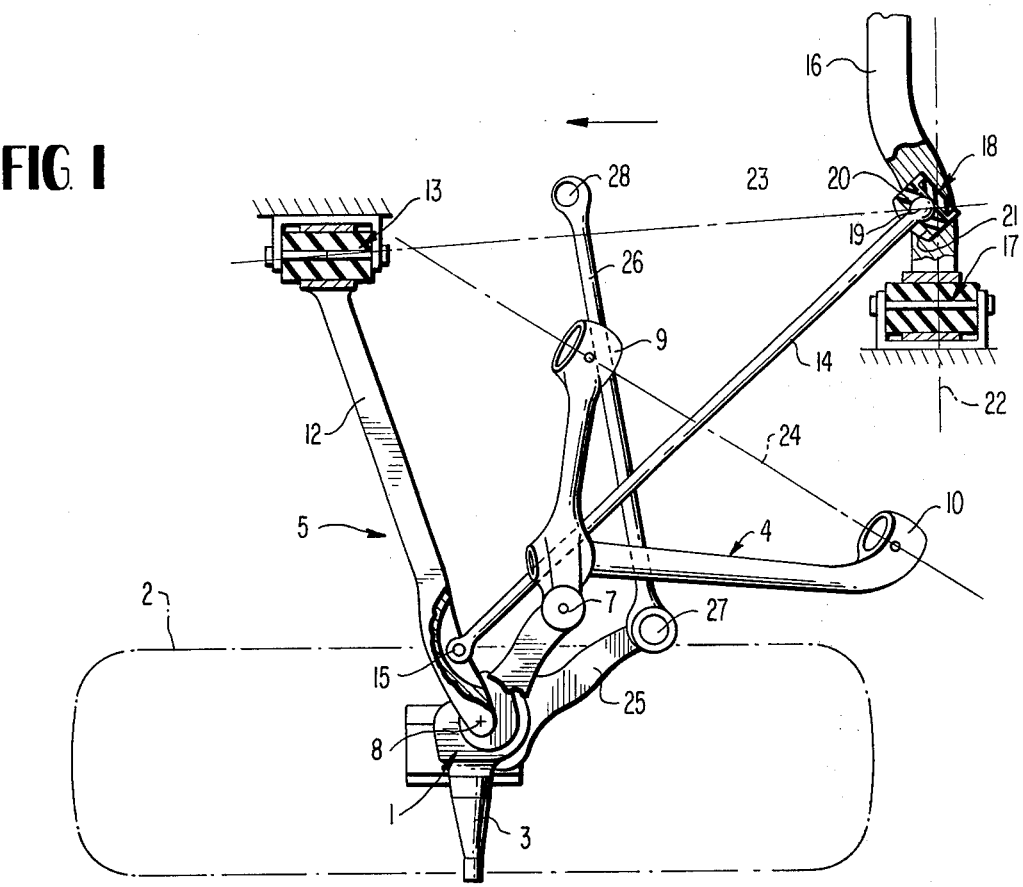
FIG. 1 is a plan view of a front wheel suspension for motor vehicles in accordance with the present invention.
Figure 2:
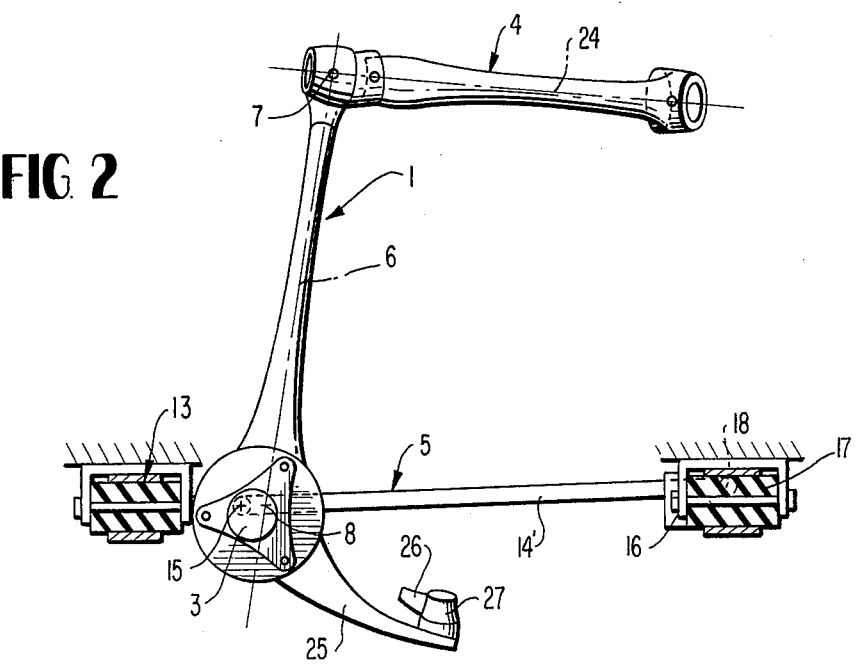
FIG. 2 is a side elevational view of the wheel suspension according to FIG. 1 whereby a showing of the wheel has been dispensed with for the sake of clarity.
Figure 3:
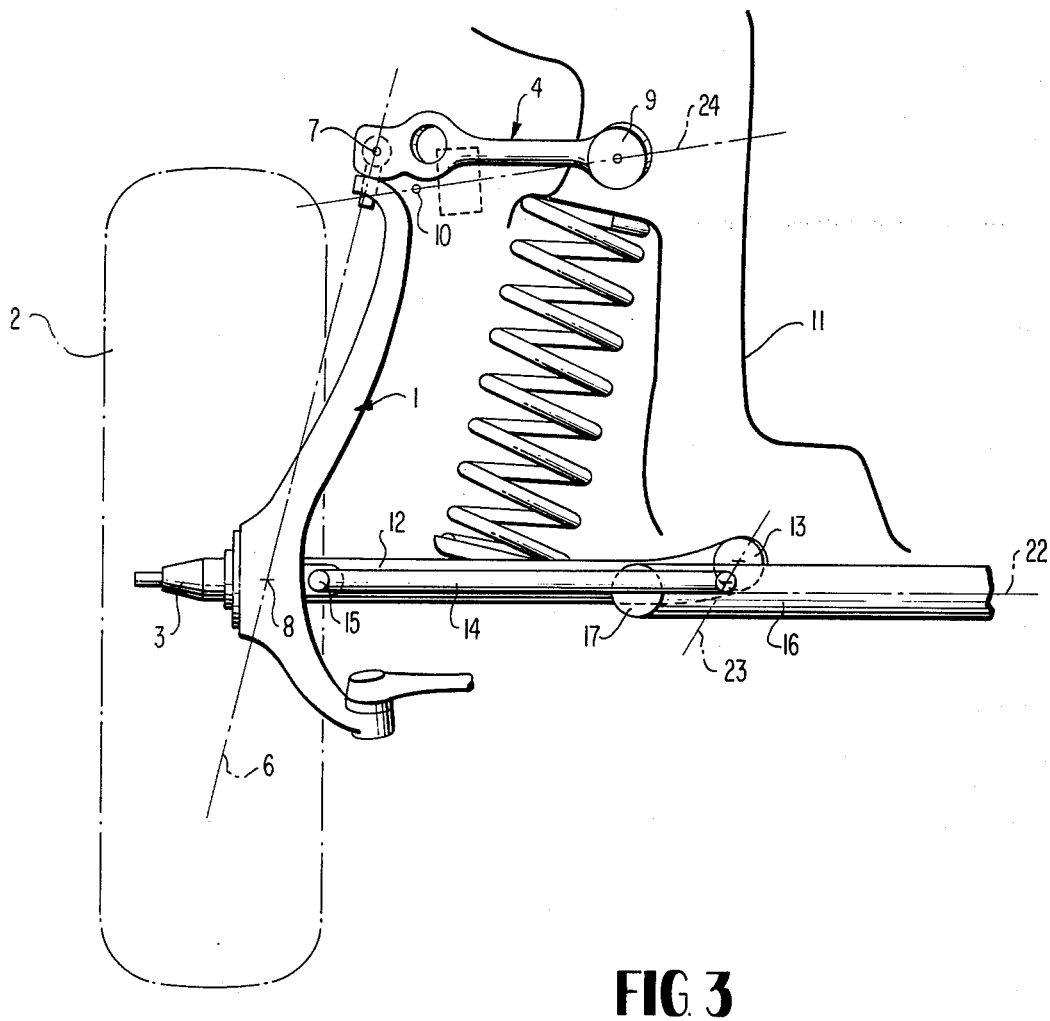
FIG. 3 is a rear elevational view of the front wheel suspension illustrated in FIGS. 1 and 2.

Referring now to the drawing wherein like reference numerals are used throughout the various views to designate like parts, the front wheel suspension illustrated in FIGS. 1 to 3 is constructed as independent wheel suspension and includes a wheel carrier generally designated by reference numeral 1. The wheel 2 is carried by the wheel carrier 1 by way of the wheel pin or spindle 3. In its turn, the wheel carrier 1 is retained by way of an upper guide member generally designated by reference numeral 4 and by way of a lower guide member generally designated by reference numeral 5 whose points of pivotal connection 7 and 8 at the wheel carrier 1 define the steering axis 6 (FIGS. 2 and 3).

The upper guide member 4 is connected with the vehicle superstructure in a conventional manner not illustrated in detail in the points of pivotal connection 9 and 10; the vehicle superstructure which is of any conventional type, is therefore only indicated schematically in FIG. 3 within its area delimiting the wheel casing by a contour line and is designated thereat by reference numeral 11. Furthermore, also the lower guide member 5 which, like the upper guide member 4 is constructed triangularly shaped, is also supported with respect to the vehicle superstructure. The support of the forward guide arm 12 at the vehicle superstructure 11 thereby takes place directly by way of an elastic bearing support generally designated by reference numeral 13 which is constructed relatively hard in the direction of its axis extending in the vehicle longitudinal direction 14' (FIG. 2) i.e., in the axial direction and is constructed relatively soft in the radial direction. The forward guide arm 12 is supported in the vehicle longitudinal direction by the rear guide arm 14 which serves as tension and compression strut and which is pivotally connected with the guide arm 12 in a point of pivotal connection 15 located near the wheel carrier 1. The rear guide arm 14 is not directly supported with respect to the vehicle superstructure 11 but instead is supported with respect thereto by the interposition of a cross yoke 16. The guide arm 14, as is illustrated for one of the guide arms 14, is pivotally supported at the cross yoke 16 in a point generally designated by reference numeral 18 whereby the cross yoke 16, in its turn, with a position symmetrical to the longitudinal center axis of the vehicle, is elastically supported or mounted at the vehicle superstructure in at least two points of pivotal connection generally designated by reference numeral 17 and serves as common support member for the rear guide arms 14 of the lower guide members 5 of the mutually oppositely disposed wheel suspensions belonging to the front wheel axle. The point of pivotal connection 18 is constituted in the illustrated embodiment by a ball joint whose ball 19 is supported relatively hard in the direction of the extension of the guide arm 14. The support in the lateral direction, in contrast thereto, is kept relatively softer. Corresponding support elements 20 (FIG. 1) serve as support elements coordinated to the ball 19 which are arranged within a housing 21 which is inserted into a corresponding aperture or recess of the cross yoke 16 or, though not illustrated, may also be constituted by this aperture. The point of pivotal connection 18 of the rear guide arm 14 at the cross yoke 16 is so located in the illustrated embodiment that the force line of action determined by the point of pivotal connection 18 and the corresponding point of pivotal connection 15 provided with respect to the forward guide arm 12, intersects approximately the straight line 22 connecting the points of pivotal connection 17 of the cross yoke 16 at the vehicle superstructure. Undesirable distortion or twisting of the cross yoke 16 about the straight connecting line 22 acting as an axis of rotation due to the support forces applied by way of the rear guide arm 14 is thereby avoided. A certain distortion or twisting may, however, be desirable in order to obtain thereby an improvement of the brake nose-diving support in that during braking, the point of pivotal connection 18 of the lower guide member at the cross yoke 16 moves slightly upwardly, and accordingly, an inclination of the pivot axis 23 obliquely rearward and upwardly will result.

With a view toward the overall behavior of the illustrated wheel suspension, it is appropriate if the pivot axis 24 of the upper guide member 4 extends obliquely rearwardly and outwardly with a slight inclination toward the rear.

Furthermore, a steering lever or steering arm 25 is connected with the wheel carrier 1, at which engages pivotally the tie rod or track rod 26. The track rod or tie rod 26 has in the neutral position of the steering system preferably such a position that the straight line connecting its points of pivotal connection 27 and 28 thereof (FIG. 1) and the straight line determined by the points of pivotal connection 13 and 8 of the forward guide arm 12 at the vehicle superstructure and at the wheel carrier 1, intersect within an area which as viewed in plan view, lies outside of the intersecting lines of the wheel plane with the ground plane at the point of contact of the wheel. This leads to a steering geometry which under the influence of longitudinal forces, thus also of brake forces has as a consequence a tendency for the wheel 2 to go over into toe-in, which has proved as advantageous for a neutral driving behavior of the vehicle with brakes acting unequally on opposite sides. Influences counteracting this tendency are relatively small in the illustrated wheel suspension according to the present invention notwithstanding the radially soft construction of the point of pivotal connection of the forward guide arm 12 formed by the elastic bearing support 13 and coordinated to the vehicle superstructure, because in case of a longitudinal force interaction on the wheel, only a relatively small, radially outwardly acting tensional force component becomes effective on the bearing support 13 as compared to a construction in which the forward and the rear guide arm of the lower guide member are rigidly connected with each other. The illustrated solution therefore represents a wheel suspension which, by reason of the construction of the lower guide member and the support thereof by way of the yoke 16 which is transversely displaceable under the influence of unilateral forces, produces a completely satisfactory and at least far-reachingly neutral driving behavior which can be still further improved by the described steering geometry.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A front wheel suspension for a motor vehicle having a superstructure with its front wheels disposed opposite one another on the two vehicle sides, said suspension comprising a substantially triangularly shaped guide means for each said wheels, each said guide means of each vehicle side having a forward and rear guide arm pivotally connected with each other, means pivotally and elastically connecting the corresponding forward guide arms directly to the vehicle superstructure to provide a relatively soft absorption of forces in the vehicle transverse direction, a cross yoke means common to the wheel guide means on both vehicle sides elastically connected with the vehicle superstructure, means operatively connecting the respective rear guide arms on said cross yoke, each said rear guide connecting means including elastic means elastically connecting said rear guide to the cross yoke means.

2. A front wheel suspension according to claim 1, characterized in that said connecting means for connecting the rear guide arm to the cross yoke means includes both pivotal and elastic means such that said connection of the rear guide arm with the cross yoke means provides a relatively hard absorption of forces in the direction of the line of force determined by the pivotal connections of the rear guide arm.

3. A wheel suspension according to claim 2, characterized in that the cross yoke means is elastically connected with longitudinal bearers of the vehicle superstructure.

4. A front wheel suspension according to claim 2, characterized in that the forward guide arm extends generally in the transverse direction of the vehicle.

5. A front wheel suspension according to claim 4, characterized in that the rear guide arm extends obliquely rearwardly.

6. A front wheel suspension according to claim 5, characterized in that the rear guide arm is so pivotally connected at the cross yoke means that the line of force determined by the points of pivotal connection thereof at least passes in proximity of the straight line connecting the points of pivotal connection of the cross yoke means at the vehicle superstructure.

7. A front wheel suspension according to claim 6, characterized in that the line of force determined by the points of pivotal connection of the rear guide arm substantially intersects the straight line connecting the points of pivotal connection of the cross yoke means at the vehicle superstructure.

8. A front wheel suspension according to claim 6, characterized in that the connection of the rear guide arm with the cross yoke means is constituted by a ball joint means.

9. A front wheel suspension according to claim 8, characterized in that the ball joint means includes socket means and elastic cushion means, the socket means providing a relatively hard pivotal connection in the direction of the line connecting the points of pivotal connection of the rear guide arm while the elastic cushion means provides a relatively softer support in a direction perpendicular thereto.

10. A front wheel suspension according to claim 9, characterized in that the rear guide arm extends obliquely inwardly in the rearward direction so that its point of pivotal connection at the cross yoke means is disposed closer to the vehicle longitudinal center line than its point of pivotal connection with the forward guide arm.

11. A front wheel suspension according to claim 10, characterized in that the pivotal bearing support of the forward guide arm at the vehicle superstructure includes a cushion means providing a relatively softer support in the radial direction as compared to the support in the axial direction.

12. A wheel suspension according to claim 11, characterized in that the axial direction extends generally in the vehicle longitudinal direction.

13. A front wheel suspension according to claim 12, characterized in that a wheel carrier means is supported at the superstructure by said guide means and in that a steering means including a track rod is operatively connected with the wheel carrier means, the track rod being pivotally connected at both ends thereof and the straight line defined by the points of pivotal connection of the track rod and the straight line defined by the points of pivotal connection of the forward guide arm at the vehicle superstructure and at the wheel carrier means intersecting within an area, as viewed in plan view, which is disposed outside of the intersection of the wheel plane and the ground plane where the wheel makes contact.

14. A front wheel suspension according to claim 13, characterized in that the wheel suspension also includes an upper triangularly shaped guide means having two guide arms which are pivotally supported at the vehicle superstructure, the first-mentioned guide means forming the lower guide means of the suspension.

15. A front wheel suspension according to claim 14, characterized in that the pivot axis of the upper guide means extends obliquely outwardly toward the rear.

16. A front wheel suspension according to claim 15, characterized in that the line of force determined by the points of pivotal connection of the rear guide arm substantially intersects the straight line connecting the points of pivotal connection of the cross yoke means at the vehicle superstructure.

17. A front wheel suspension according to claim 1, characterized in that the forward guide arm extends generally in the transverse direction of the vehicle.

18. A front wheel suspension according to claim 17, characterized in that the rear guide arm extends obliquely rearwardly.

19. A front wheel suspension according to claim 18, characterized in that the rear guide arm is so pivotally connected at the cross yoke means that the line of force determined by the points of pivotal connection thereof at least passes in proximity of the straight line connecting the points of pivotal connection of the cross yoke means at the vehicle superstructure.

20. A front wheel suspension according to claim 19, characterized in that the line of force determined by the points of pivotal connection of the rear guide arm substantially intersects the straight line connecting the points of pivotal connection of the cross yoke means at the vehicle superstructure.

21. A front wheel suspension according to claim 18, characterized in that the connection of the rear guide arm with the cross yoke means is constituted by a ball joint means.

22. A front wheel suspension according to claim 21, characterized in that the ball joint means includes socket means and elastic cushion means, the socket means providing a relatively hard pivotal connection in the direction of the line connecting the points of pivotal connection of the rear guide arm while the elastic cushion means provides a relatively softer support in a direction perpendicular thereto.

23. A front wheel suspension according to claim 18, characterized in that the pivotal bearing support of the forward guide arm at the vehicle superstructure includes a cushion means providing a relatively softer support in the radial direction as compared to the support in the axial direction.

24. A wheel suspension according to claim 23, characterized in that the axial direction extends generally in the vehicle longitudinal direction.

25. A front wheel suspension according to claim 18, characterized in that a wheel carrier means is supported at the superstructure by said guide means and in that a steering means including a track rod is operatively connected with the wheel carrier means, the track rod being pivotally connected at both ends thereof and the straight line defined by the points of pivotal connection of the track rod and the straight line defined by the points of pivotal connection of the forward guide arm at the vehicle superstructure and at the wheel carrier means intersecting within an area, as viewed in plan view, which is disposed outside of the intersection of the wheel plane and the ground plane where the wheel makes contact.

26. A front wheel suspension according to claim 18, characterized in that the rear guide arm extends obliquely inwardly in the rearward direction so that its point of pivotal connection at the cross yoke means is disposed closer to the vehicle longitudinal center line than its point of pivotal connection with the forward guide arm.

27. A front wheel suspension according to claim 1, characterized in that the rear guide arm is so pivotally connected at the cross yoke means that the line of force determined by the points of pivotal connection thereof at least passes in proximity of the straight line connecting the points of pivotal connection of the cross yoke means at the vehicle superstructure.

28. A front wheel suspension according to claim 1, characterized in that the connection of the rear guide arm with the cross yoke means is constituted by a ball joint means.

29. A front wheel suspension according to claim 28, characterized in that the ball joint means includes socket means and elastic cushion means, the socket means providing a relatively hard pivotal connection in the direction of the line connecting the points of pivotal connection of the rear guide arm while the elastic cushion means provides a relatively softer support in a direction perpendicular thereto.

30. A front wheel suspension according to claim 1, characterized in that the pivotal bearing support of the forward guide arm at the vehicle superstructure includes a cushion means providing a relatively softer support in the radial direction as compared to the support in the axial direction.

31. A wheel suspension according to claim 30, characterized in that the axial direction extends generally in the vehicle longitudinal direction.

32. A front wheel suspension according to claim 1, characterized in that a wheel carrier means is supported at the superstructure by said guide means and in that a steering means including a track rod is operatively connected with the wheel carrier means, the track rod being pivotally connected at both ends thereof and the straight line defined by the points of pivotal connection of the track rod and the straight line defined by the points of pivotal connection of the forward guide arm at the vehicle superstructure and at the wheel carrier means intersecting within an area, as viewed in plan view, which is disposed outside of the intersection of the wheel plane and the ground plane where the wheel makes contact.

33. A front wheel suspension according to claim 18, characterized in that the wheel suspension also includes an upper triangularly shaped guide means having two guide arms which are pivotally supported at the vehicle superstructure, the first-mentioned guide means forming the lower guide means of the suspension.

34. A front wheel suspension according to claim 33, characterized in that the pivot axis of the upper guide means extends obliquely outwardly toward the rear.

* * * * *